US005992684A

United States Patent [19]

Russell

[11] Patent Number: 5,992,684

[45] **Date of Patent: *Nov. 30, 1999**

[54] WATER DISPENSING DEVICE

[76] Inventor: Larry L. Russell, 200 Martinique Ave., Tiburon, Calif. 84820

[ * ] Notice: This patent issued on a continued prosecution application filed under 37 CFR 1.53(d), and is subject to the twenty year patent term provisions of 35 U.S.C. 154(a)(2).

[21] Appl. No.: 08/788,747

[22] Filed: Jan. 24, 1997

Related U.S. Application Data

[60] Provisional application No. 60/010,667, Jan. 26, 1996.

[51] Int. Cl.[6] .................................................. G01F 11/00

[52] U.S. Cl. ............................ 222/1; 222/67; 222/146.1; 222/183; 222/190; 222/335

[58] Field of Search ............................ 222/67, 68, 146.1, 222/146.5, 146.6, 183, 190, 335, 1; 261/DIG. 7

[56] References Cited

U.S. PATENT DOCUMENTS

| | | | |
|---|---|---|---|
| 1,809,958 | 6/1931 | Wright . | |
| 1,930,220 | 10/1933 | Askin . | |
| 2,291,256 | 7/1942 | Rehrig et al. . | |
| 2,557,252 | 6/1951 | Bannister et al. . | |
| 3,018,915 | 1/1962 | Larson . | |
| 3,325,058 | 6/1967 | West . | |
| 4,153,181 | 5/1979 | Parker et al. | 222/61 |
| 4,456,149 | 6/1984 | Sciortino | 222/1 |
| 4,597,509 | 7/1986 | Pereira | 222/146.6 |
| 4,629,096 | 12/1986 | Schroer et al. | 222/146.6 |
| 4,881,380 | 11/1989 | Mrugala et al. | 62/389 |
| 4,940,164 | 7/1990 | Hancock et al. | 222/146.6 |
| 4,958,747 | 9/1990 | Sheets | 222/67 |
| 5,184,476 | 2/1993 | Desrosiers et al. | 62/389 |
| 5,246,141 | 9/1993 | Burrows | 222/146.6 |
| 5,441,179 | 8/1995 | Marsh | 222/190 |

*Primary Examiner*—Joseph A. Kaufman
*Attorney, Agent, or Firm*—Limbach & Limbach LLP

[57] ABSTRACT

A water dispenser includes a housing containing a water source and a water storage tank positioned above the water source. A water line connects the water source and the water storage tank. A vacuum pump draws a vacuum on the water storage tank thereby drawing water through the water line from the water source to the water storage tank. A tap is coupled to the water storage tank and extends outside the housing to dispense water. Optionally, a carbon dioxide injection system may be provided for producing carbonated water. Further, an ultraviolet light source may be positioned adjacent the water line for disinfection.

8 Claims, 1 Drawing Sheet

WATER DISPENSING DEVICE

This application claims benefit of provisional application Ser. No. 60/010,667 filed Jan. 26, 1996.

BACKGROUND OF THE INVENTION

The present invention relates to a water dispensing device.

SUMMARY OF THE INVENTION

The present invention is a method and apparatus for dispensing water. In accord with the invention, a housing is provided with one or more taps extending from the outside of the housing. The remainder of the physical elements are fully contained within the housing. A water source is positioned within the housing, and a water storage tank is positioned within the housing above the water source. A water line connects the water source and the water storage tank. Means are provided for drawing a vacuum on the water storage tank thereby drawing water through the water line from the water source to the water storage tank. Also, means are provided for disinfection of the water source, if necessary.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

The invention consists of a water dispensing device which has the water supply bottle on a roll-out shelf located at the bottom of the unit. The water dispensing device is large enough to hold bottles containing up to 30 liters.

The dispensing device has the capability of supplying cold water, hot water, and cool and/or carbonated water. Taps are incorporated for each of the sources of water. The taps have been raised to an ergonomically desirable height to improve user access. The devices are especially suitable for residential and commercial applications wherein an improved appearance is desired since the protruding bottle is eliminated. Additionally, chances of injury are lessened to refill water, since users will no longer have to lift the bottle, as often occurs with the conventional water bottles in top feed devices.

The dispensing device incorporates ambient temperature and insulated cold water storage tanks. The device has an electric heater for producing hot water, and an optional carbon dioxide mixer for producing sparkling water at the tap. Also, an optional ultraviolet light may be provided for disinfection.

Water is lifted from an ambient storage reservoir to the insulated water storage tank by initiating a vacuum pump to reduce the pressure in the insulated storage tank. A lifting force is created to lift the water from the ambient water storage reservoir until the storage tank is full. At that point, the vacuum pump is shut off and the vacuum is relieved by drawing incoming air from the atmosphere through a Pasteur/activated carbon type filter to remove bacteria and other contaminants.

Figure 1:
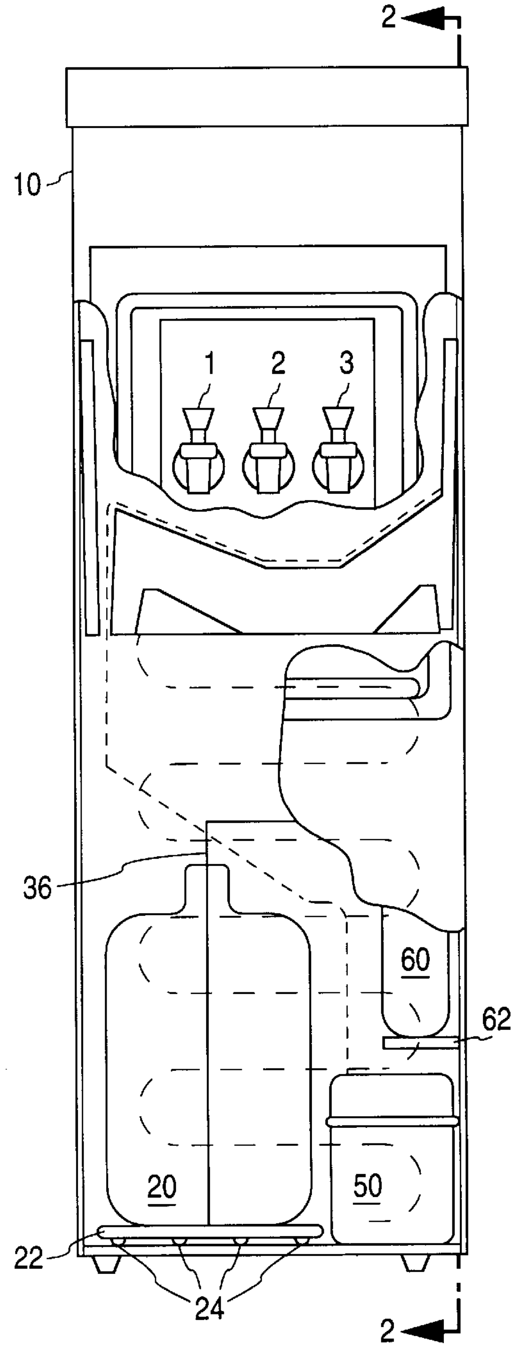
FIG. 1 is a front view of a water dispensing device in accord with the present invention including a partial cutaway view.
Figure 2:
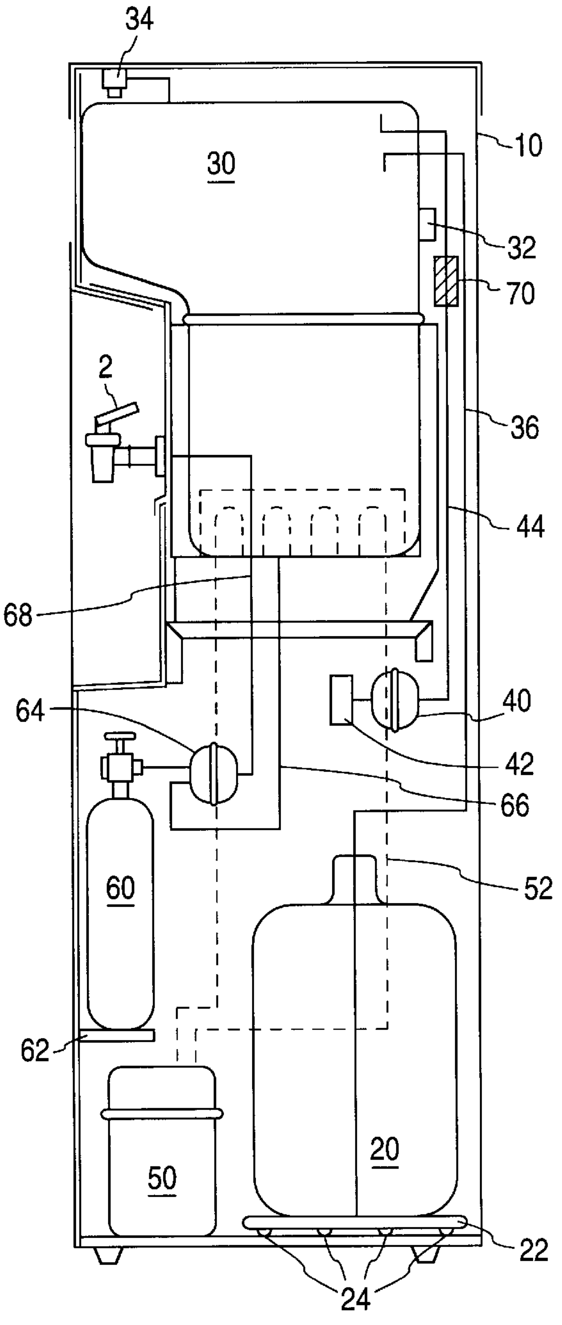
FIG. 2 is a side view of the water dispensing device taken across section 2—2 of FIG. 1.

Referring now to FIGS. 1 and 2, the water dispensing device of the present invention includes a housing 10 having a series of taps 1, 2 and 3 mounted on the front of the housing in a well known manner. In this embodiment, tap 1 is connected to provide cold water, tap 2 is connected to provide carbonated water, and tap 3 is connected to provide hot water.

The housing 10 includes a door or removable panel (not shown) to provide access to the interior of the housing. A water bottle 20 sits on a shelf 22 which includes rollers 24 or other equivalent means which allow the shelf to roll-out thereby permitting easy access for changing the water bottle. The water bottle is fully conventional, replaceable and refillable, such as those commonly available from commercial water delivery services. The present embodiment contemplates bottle sizes up to 30 liters, but is not limited in this regard.

A water storage tank 30 is affixed inside the top portion of the housing 10. The water storage tank 30 is made from stainless steel and lined with inert plastic, such as polyethylene, then insulated with styrofoam. The volume of the water storage tank 30 is this embodiment is approximately two gallons.

The water storage tank 30 includes a level probe 32 for providing a fill signal when the level of water in the water storage tank falls below the level of the probe. For example, a microswitch float or a capacitance probe or any other conventional level sensing device suitable for water immersion may be used.

The water storage tank 30 also includes a vent or vacuum relief valve 34 which preferably includes a Pasteur activated carbon type filter (not shown) to remove airborne bacteria and dirt. However, in particularly dusty environments, or where additional precaution is desired, an ultraviolet light source could be incorporated within the water line 36 to kill bacteria. The vent 34 is activated by engaging a solenoid (not shown).

The water line 36 is preferably ¼ inch polypropylene and runs from the top of the water storage tank 30 to the water bottle 20. The water line 36 includes a portion of flexible tubing with foot valve to permit easy removal and insertion when changing water bottles.

A vacuum pump 40 and filter 42 are connected by vacuum line 44 to the water storage tank 30. The vacuum pump 40 is connected to draw a vacuum in the headspace of the water storage tank 30, such that water will be lifted out of the water bottle 20 and into the water storage tank through water line 22. For example, a quiet vacuum ranging from two to twenty inches of mercury is applied to provide sufficient lift. The vacuum may be generated by a Gast type oiless 1/16 horsepower continuous duty vacuum pump model MOA-P101-AA or equivalent capable of 0.31 cfm at five inches mercury and 0.07 cfm at twenty inches of mercury. When the storage tank 30 is full, the vacuum pump 40 is shut off and the vacuum is relieved by drawing air in through vent 34.

A compressor 50 is mounted within the housing 10 with its coils 52 either wrapped around or inserted into the insulated storage tank 30, or located on a plate below the storage tank. For example, a Taiwan Electric Works compressor or suitable equivalent may be used.

A carbon dioxide bottle or canister 60 is mounted within the housing, e.g. on shelf 62. The $CO_2$ canister 60 is coupled to a mixer 64. A water line 66 is coupled between the storage tank 30 and the mixer 64. The mixer 64 thus, outputs carbonated water to tap 2 through water line 68.

An electric heater 70 is coupled to the tap 3 to quickly heat water passing through that tap. A Taiwan Electric Works heater or equivalent may be used.

It should be understood that the invention is not intended to be limited by the specifics of the above-described embodiment, but rather defined by the accompanying claims.

I claim:

1. A water dispensing apparatus, comprising:

a water source;

a water storage tank positioned above the water source;

a water line between the water source and the water storage tank;

a vacuum pump for drawing a vacuum in a headspace above water in the water storage tank through a vacuum line connected therebetween, whereby water is drawn through the water line from the water source to the water storage tank;

a housing containing the water source, the water storage tank, the water line, and the vacuum pump; and a tap coupled to the water storage tank and extending outside the housing.

2. A water dispensing apparatus, comprising:

a housing having a front, a top and a bottom;

an insulated water storage tank positioned within the housing proximate to the top of the housing;

at least a first tap coupled to a lower portion of the water storage tank and extending through the front of the housing;

a water bottle positioned within the housing proximate to the bottom of the housing;

a first water line coupled between the water bottle and the water storage tank;

a vacuum pump for drawing a vacuum in a headspace above water in the water storage tank through a vacuum line connected therebetween, whereby water is lifted out of the water bottle via the water line into the water storage tank without contacting the vacuum pump; and means for venting the vacuum on the water storage tank.

3. The water dispensing apparatus of claim 2, further comprising a compressor having coils positioned proximate to the water storage tank.

4. The water dispensing apparatus of claim 2, further comprising a second tap coupled to a lower portion of the water storage tank and extending through the front of the housing, and a heater proximate to the coupling.

5. The water dispensing apparatus of claim 2, further comprising:

a third tap extending through the front of the housing;

a carbon dioxide bottle positioned within the housing; and a mixer having two inputs and one output, wherein one of said inputs is coupled to the carbon dioxide bottle, the other of said inputs is coupled to the water storage tank, and the output is coupled to the third tap.

6. The water dispensing apparatus of claim 2, further comprising means for determining a level of water stored in the water storage tank, and means responsive to the level determining means for engaging the vacuum pump.

7. The water dispensing apparatus of claim 2, further comprising an ultraviolet light source positioned proximate to the water line.

8. A method for dispensing water, comprising:

providing a water source;

providing a water storage tank positioned above the water source;

providing a water line between the water source and the water storage tank; and using a vacuum pump for drawing a vacuum in a headspace above water in the water storage tank through a vacuum line connected therebetween, thereby drawing water through the water line from the water source to the water storage tank without contacting the water to be dispensed.

* * * * *